Nov. 16, 1926.
C. H. HAPGOOD
INDICATING DEVICE
Filed June 23, 1923
1,606,936
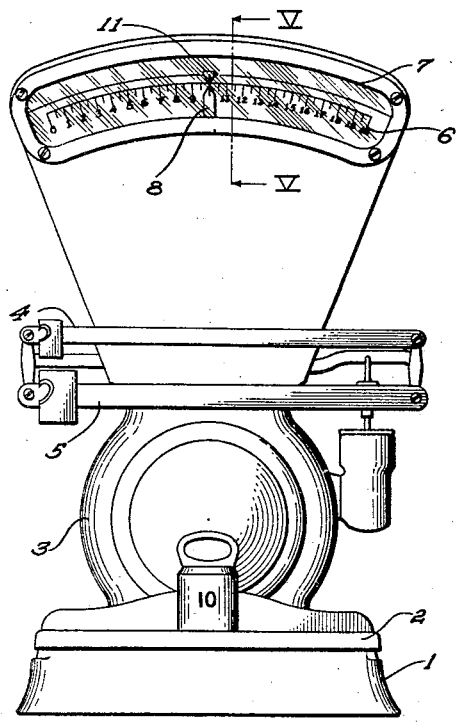
Fig. I.
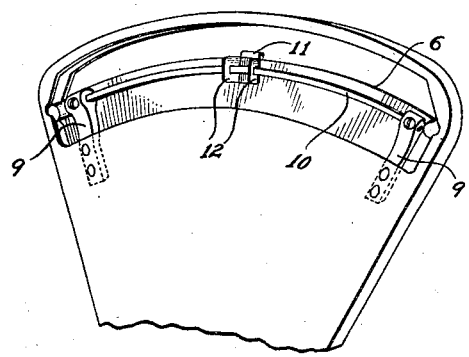
Fig. II.
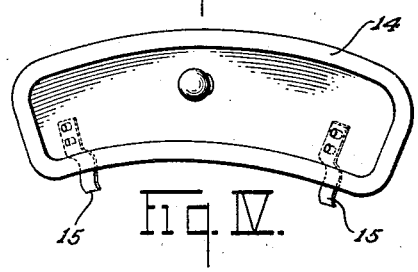
Fig. IV.
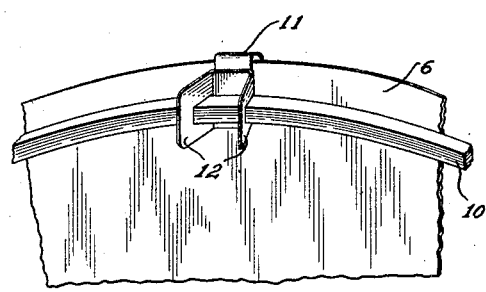
Fig. III.
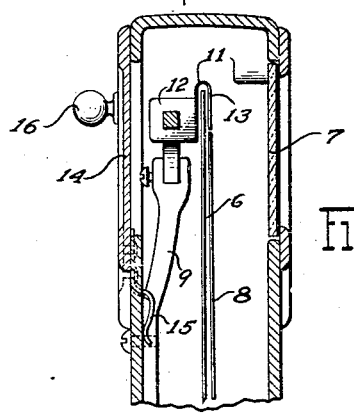
Fig. V.
Inventor
CLARENCE H. HAPGOOD.
By   Marshall
Attorney Patented Nov. 16, 1926.

1,606,936

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

INDICATING DEVICE.

Application filed June 23, 1923. Serial No. 647,230.

This invention relates to indicating devices, and particularly to so-called predetermined weight indicators, and it has for its principal object the provision of a device of this kind which is simple in construction, inexpensive to manufacture, and which is capable of being applied to scales of various types and sizes without material change in the parts.

Another object of the invention is to provide a device of this kind which may be readily set and re-set without the use of tools.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a scale embodying my invention;

Figure II is a fragmentary perspective view of the rear side of a fan-shaped housing of a scale, with the cover plate removed to show the application of my invention;

Figure III is an enlarged fragmentary perspective view showing some of the elements of my invention in greater detail;

Figure IV is an enlarged perspective view of a cover plate employed in connection with the indicating device shown in Figure II; and Figure V is an enlarged transverse vertical sectional view taken substantially on the line V—V of Figure I.

Referring to the drawings in detail, the invention is shown as applied to a fan scale having a base 1 within which are located levers (not shown) supporting the commodity-receiving platform 2. At the rear of the base 1 is an upright housing 3 which supports a beam carrying tare and capacity beams 4 and 5 and contains suitable automatic load-counterbalancing mechanism (not shown), the tare beam and automatic load-counterbalancing mechanism being connected to the levers within the base 1 in the well-known manner. Supported within the upper end of the housing 3 is a chart 6 which is visible through a suitable window 7 in the front of the housing, and connected to the automatic load-counterbalancing mechanism and co-operating with the chart 6 is an indicating hand 8. The scale so far described is of a well-known type and it is to be regarded as only one of the numerous types of scales to which my invention is applicable.

When scales of this and similar types are used for weighing repeated drafts of the same weight, it is desirable that a definite outstanding mark be provided so that the operator is relieved of the necessity of selecting a particular one from among the several identical graduations on the chart, and a single outstanding mark to which the indicator may be brought is particularly desirable in case the weight of the drafts to be weighed is not represented by a whole number, so that the indicator hand in registering the weights comes to rest between the numbered graduations on the chart. It is desirable that such predetermined weight mark be shiftable in order that it may be employed with different series of drafts, and it is further desirable that while the device be located inside the casing which houses the indicating mechanism, it be readily accessible when occasion for shifting it arises.

In the device constructed according to my invention, a pair of brackets 9 are fixed within the housing 3 in such position that their upper ends are located back of the chart 6 adjacent its upper corners. Each of the brackets 9 is provided with a transverse opening which receives the end of a rod 10, which is preferably non-circular in cross-section and which is bent into arcuate shape about a center lying in the axis of movement of the indicator 8.

Mounted upon the rod 10 intermediate the brackets 9 is a predetermined weight pointer 11 constructed of resilient sheet metal having a pair of rearwardly-extending ears 12 with openings through which the arcuate rod 10 extends, and a point 13 which extends over the top of the chart 6 and downwardly in the plane of the indicator hand 8 to a point just out of reach of the hand (see Figures I and V). On the point 13 is a predetermined weight mark adapted to register with a similar mark on the indicator hand 8. Owing to the resilient nature of the material of which the pointer 11 is made, the ears 12 tend to spring apart and the forward and rearward edges of the openings through the ears are, therefore, resiliently held in binding engagement with the rod so that the pointer will remain wherever it is placed. When it is desired to shift the pointer it is only necessary that the operator grasp the ears 12 with his thumb and finger and press them slightly toward each other. The pointer may then be easily moved along the arcuate rod.

Ready access to the pointer is provided by a removable cover plate 14, which takes the place of the usual rear window with its scroll or bezel. The cover plate 14 is not held in place by screws or bolts, but is provided with a pair of spring clips 15 which press against the interior of the housing when the cover plate is in place. The cover plate is provided with a knob 16 so that when it is desired to remove the plate the operator may grasp the knob 16 and pull the plate upwardly until the spring clips 15 are disengaged from the interior of the housing. After making the desired adjustment of the pointer 11, the cover plate may be replaced by inserting the spring clips 15 through the opening in the rear of the housing and pushing the cover plate downwardly, so that the rear wall of the housing is resiliently clamped between the clips 15 and the lower edge of the plate.

It is apparent that in equipping scales of different sizes with my device no change is necessary in the brackets 9 and pointer 11, but that the device may be applied to a scale of any size by merely varying the length and curvature of the rod 10.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a chart, a rod located back of said chart, and a pointer adjustably mounted on said rod and having a point extending over the front of said chart.

2. In a device of the class described, in combination, a chart, a rod adjacent the edge thereof, and a pointer having a perforated ear through which said rod passes, the sides of the perforation in said ear being resiliently held in clamping engagement with said rod, said pointer having a point extending over the front of said chart.

3. In a device of the class described, in combination, a chart, a rod extending adjacent the edge thereof, a pointer of resilient material having a pair of ears, said rod passing through said ears, said ears tending to spring away from each other and thereby resiliently holding said pointer against movement along said rod, said pointer having a point extending over the front of said chart.

4. In a device of the class described, in combination, a housing, a chart within said housing, a pair of brackets mounted within said housing rearwardly of said chart, a rod supported by said brackets and lying back of said chart, and a pointer adjustably mounted on said rod and having a point extending over the front of said chart.

5. In a device of the class described, in combination, a housing, a chart within said housing, a pair of brackets mounted within said housing rearwardly of said chart, a rod of non-circular cross-section supported by said brackets and lying back of said chart, and a pointer adjustably mounted on said rod and having a point extending over the front of said chart.

CLARENCE H. HAPGOOD.